United States Patent
Jimenez Peris et al.

(10) Patent No.: US 11,934,373 B2
(45) Date of Patent: Mar. 19, 2024

(54) SYSTEM FOR CONFLICT LESS CONCURRENCY CONTROL

(71) Applicant: LEANXCALE, S.L., Madrid (ES)

(72) Inventors: Ricardo Jimenez Peris, Madrid (ES); Francisco Jose Ballesteros Camara, Madrid (ES); Patricio Martinez Garcia, Madrid (ES)

(73) Assignee: LEANXCALE, S.L., Madrid (ES)

( * ) Notice: Subject to any disclaimer, the term of this patent is extended or adjusted under 35 U.S.C. 154(b) by 0 days.

(21) Appl. No.: 18/040,650

(22) PCT Filed: Aug. 5, 2021

(86) PCT No.: PCT/EP2021/071884
§ 371 (c)(1),
(2) Date: Feb. 6, 2023

(87) PCT Pub. No.: WO2022/029236
PCT Pub. Date: Feb. 10, 2022

(65) Prior Publication Data
US 2023/0306011 A1    Sep. 28, 2023

(30) Foreign Application Priority Data
Aug. 6, 2020  (EP) .................... 20382729

(51) Int. Cl.
*G06F 16/23*    (2019.01)
(52) U.S. Cl.
CPC ...... *G06F 16/2322* (2019.01); *G06F 16/2329* (2019.01)

(58) Field of Classification Search
CPC ............. G06F 16/2322; G06F 16/2329; G06F 16/188; G06F 16/137; G06F 16/185
See application file for complete search history.

(56) References Cited

U.S. PATENT DOCUMENTS 5,870,758 A * 2/1999 Bamford ............. G06F 16/2343
8,407,195 B2 * 3/2013 Larson ................ G06F 16/2471
707/704

(Continued)

OTHER PUBLICATIONS

Article entitled "Efficiently making (almost) any concurrency control mechanism serializable", Cornell University, May 4, 2017, DOI: 10.1007/S00778-017-0471-8.

(Continued)

*Primary Examiner* — Hosain T Alam
*Assistant Examiner* — Robert F May

(57) ABSTRACT

The present invention refers to the field of transactional data management. The invention provides a transactional semantic concurrency control system for managing a database, wherein the system comprises a data store engine which is adapted to manage the database comprising value rows, and each value row comprising a primary key uniquely identifying each row, at least one semantic column and a commit timestamp; wherein the data store engine is further adapted to manage operation rows, which are rows comprising a primary key, at least one operation to be applied over at least one semantic column of a value row identified by the primary key, and a commit timestamp; store the value rows and the operation rows; generate an operation row when it receives an operation that inserts, updates, upserts, and/or deletes a row of the database with the commit timestamp of the operation; and apply the operations of at least one operation row when a trigger condition is satisfied.

9 Claims, 2 Drawing Sheets

| | row pk=1 | | | | row pk=9 | | | | row pk=10 | | | | | |
|---|---|---|---|---|---|---|---|---|---|---|---|---|---|---|
| pk | col1 | col2 | cts | pk | col1 | col2 | cts | pk | col1 | col2 | cts | highest generated snapshot | highest notified snapshot | Step |
| 1 | 10 | 20 | 1 | | | | | | | | | | | 0 |
| | | | | | | | | 10 | 15 | 25 | 2 | 2 | 2 | 0 |
| | | | | 9 | 5 | 10 | 3 | | | | | 3 | 3 | 5 |
| | | | | 9 | 20 | 35 | 4 | | | | | 4 | 4 | 10 |
| | | | | 9 | 35 | 60 | 8 | | | | | 9 | 9 | 13 |
| | | | | 9 | 55 | 60 | 10 | | | | | 10 | 19 | 14 |
| | | | | 9 | 55 | 50 | 14 | | | | | 19 | 19 | 17 |
| | | | | | | | | | | | | 20 | 20 | 18 |
| | | | | | | | | | | | | 21 | 21 | 26 |
| 1 | tombstone | | 22 | | | | | 10 | 15 | 35 | 22 | 22 | 22 | 27 |
| 1 | 5 | 10 | 23 | | | | | | | | | 23 | 23 | 28 |
| | | | | 9 | 60 | 50 | 24 | | | | | 24 | 25 | 34 |
| 1 | 10 | 20 | 25 | 9 | tombstone | | 25 | 10 | 15 | 45 | 25 | 25 | 25 | 34 |
| 1 | 15 | 30 | 27 | | | | | | | | | 27 | 28 | 35 |
| | | | | | | | | 10 | 15 | 55 | 28 | 28 | 28 | 35 |
| | | | | | | | | | | | | 30 | 30 | 36 |

(56) References Cited

U.S. PATENT DOCUMENTS

| | | | | |
|---|---|---|---|---|
| 10,789,217 B2* | 9/2020 | Chalakov | ............ | G06F 16/188 |
| 10,795,881 B2* | 10/2020 | Lee | ................. | G06F 16/2379 |
| 2013/0060742 A1* | 3/2013 | Chang | ............... | G06F 16/2379 |
| | | | | 707/704 |
| 2014/0013434 A1* | 1/2014 | Ranum | ............... | G06F 21/564 |
| | | | | 726/24 |
| 2015/0026131 A1* | 1/2015 | Schreter | ............ | G06F 16/221 |
| | | | | 707/638 |
| 2015/0046413 A1* | 2/2015 | Andrei | ............... | G06F 11/1448 |
| | | | | 707/695 |
| 2015/0074070 A1* | 3/2015 | Bortnikov | ......... | G06F 16/2308 |
| | | | | 707/703 |
| 2016/0147786 A1* | 5/2016 | Andrei | ............... | G06F 16/2358 |
| | | | | 707/695 |
| 2016/0171042 A1* | 6/2016 | Bendel | ................ | G06F 16/214 |
| | | | | 707/703 |
| 2016/0246864 A1* | 8/2016 | Boldt | ..................... | G06F 9/466 |
| 2017/0161352 A1* | 6/2017 | Horii | ..................... | G06F 16/283 |
| 2017/0293530 A1* | 10/2017 | Brodt | ................. | G06F 16/2365 |
| 2018/0144014 A1* | 5/2018 | Mittal | ................. | G06F 16/2322 |

OTHER PUBLICATIONS

Article entitled "High-Performance Concurrency Control Mechanisms for Main-Memory Databases", Per-Åke Larson et al., VLDB, Dec. 31, 2011, DOI: 10.14778/2095686.2095689.

\* cited by examiner

| row pk=1 | | | | row pk=9 | | | | row pk=10 | | | | highest generated snapshot | highest notified snapshot | Step |
|---|---|---|---|---|---|---|---|---|---|---|---|---|---|---|
| pk | col1 | col2 | cts | pk | col1 | col2 | cts | pk | col1 | col2 | cts | | | |
| 1 | 10 | 20 | 1 | | | | | | | | | | | 0 |
| | | | | | | | | 10 | 15 | 25 | 2 | 2 | 2 | 0 |
| | | | | 9 | 5 | 10 | 3 | | | | | 3 | 3 | 5 |
| | | | | 9 | 20 | 35 | 4 | | | | | 4 | 4 | 10 |
| | | | | 9 | 35 | 60 | 8 | | | | | 9 | 9 | 13 |
| | | | | 9 | 55 | 60 | 10 | | | | | 10 | 19 | 14 |
| | | | | 9 | 55 | 50 | 14 | | | | | 19 | 19 | 17 |
| | | | | | | | | | | | | 20 | 20 | 18 |
| | | | | | | | | | | | | 21 | 21 | 26 |
| 1 | tombstone | | 22 | | | | | 10 | 15 | 35 | 22 | 22 | 22 | 27 |
| 1 | 5 | 10 | 23 | | | | | | | | | 23 | 23 | 28 |
| | | | | 9 | 60 | 50 | 24 | | | | | 24 | 25 | 34 |
| 1 | 10 | 20 | 25 | 9 | tombstone | | 25 | 10 | 15 | 45 | 25 | 25 | 25 | 34 |
| 1 | 15 | 30 | 27 | | | | | | | | | 27 | 28 | 35 |
| | | | | | | | | 10 | 15 | 55 | 28 | 28 | 28 | 35 |
| | | | | | | | | | | | | 30 | 30 | 36 |

Fig. 1

| row pk=1 | | | | row pk=9 | | | | row pk=10 | | | | Step added | Step substituted |
|---|---|---|---|---|---|---|---|---|---|---|---|---|---|
| pk | col1 | col2 | cts | pk | col1 | col2 | cts | pk | col1 | col2 | cts | | |
| | | | | 9 | add(5) | add(10) | 3 | | | | | 3 | 5 |
| | | | | 9 | add(15) | add(25) | 8 | | | | | 6 | 13 |
| | | | | 9 | add(15) | add(25) | 4 | | | | | 8 | 10 |
| | | | | 9 | | add(-10) | 14 | | | | | 11 | 17 |
| | | | | 9 | add(20) | | 10 | | | | | 12 | 14 |
| 1 | add(5) | add(10) | 23 | | | | | | | | | 22 | 28 |
| | | | | | | | | 10 | | add(10) | 22 | 23 | 27 |
| | | | | | | | | 10 | | add(10) | 25 | 24 | 34 |
| 1 | delete | | 22 | | | | | | | | | 25 | 27 |
| | | | | 9 | add(5) | | 24 | | | | | 29 | 34 |
| 1 | add(5) | add(10) | 27 | | | | | | | | | 30 | 35 |
| | | | | 9 | delete | | 25 | | | | | 31 | 34 |
| 1 | add(5) | add(10) | 25 | | | | | | | | | 32 | 34 |
| | | | | | | | | 10 | | add(10) | 28 | 33 | 35 |

Fig. 2

SYSTEM FOR CONFLICT LESS CONCURRENCY CONTROL

FIELD OF THE INVENTION

The present invention refers to the field of transactional data management. The invention provides a transactional semantic concurrency control system for managing a database, wherein the system comprises a data store engine which is adapted to manage the database comprising value rows, and each value row comprising a primary key uniquely identifying each row, at least one semantic column and a commit timestamp; wherein the data store engine is further adapted to manage operation rows, which are rows comprising a primary key, at least one operation to be applied over at least one semantic column of a value row identified by the primary key, and a commit timestamp; store the value rows and the operation rows; generate an operation row when it receives an operation that inserts, updates, upserts, and/or deletes a row of the database with the commit timestamp of the operation; and apply the operations of at least one operation row when a trigger condition is satisfied.

PRIOR ART

Organizations store their data in databases or other data stores (also called data management systems) that are computer-based systems to store and access information. When operational data, data about the operations of the organization, is stored in these data stores, the consistency of the data becomes a crucial issue. This issue has been addressed by guaranteeing the data consistency by means of transactional data management. Transactional data management guarantees the consistency of the data in the advent of failures and/or concurrent access to the data.

A transaction is a process that enables concurrent access to shared data. A transaction brackets a sequence of data operations and confers the sequence with the so-called ACID properties: atomicity, consistency, isolation and durability. Atomicity guarantees that the effect of the updates of a transaction are atomic, that is, their effect is all-or-nothing. Either all updates succeed, or if there is a failure or explicit rollback, it is as if none of the updates were executed. Consistency is a property of the application accessing the data. Application transactions should guarantee that if they get a consistent database state, when they are completed, the database is again in a consistent state. That is, consistency requires the application to be correct and do not break any integrity constraints (data invariants) when run in isolation and starting from a consistent database state. The database can actually help to guarantee in checking that integrity constraints are not violated, and if so, abort the transaction automatically to prevent the data consistency loss. Isolation provides consistency guarantees in the advent of concurrent transactions accessing common data, according to a particular isolation level. Three popular isolation levels are serializability, snapshot isolation and read committed. Serializability requires that the concurrent execution of transactions should be equivalent to a serial order of execution. Snapshot isolation splits logically the transaction execution in two points, the start of the transaction where all reads happen logically and the end of the transaction where all the writes happen logically. Read committed simply returns the latest committed updated value. Durability guarantees that if a transaction completes successfully, then its updates cannot be lost even if there are failures.

A transaction that completes successfully is said to commit. A transaction that does not complete successfully is rollbacked, and the final effect is like it was not executed.

Serializability has the inconvenient that can highly constrain the potential concurrency because certain very common read-only predicate-based queries, might conflict with any updates happening on the same table. Snapshot isolation solves this problem because by removing read-write conflicts leveraging multi-version concurrency control. Snapshot isolation only generates write-write conflicts for concurrent transactions, that is, when two transactions try to update the same row (a row with the same primary key) and they are concurrent.

It will be first analyzed how snapshot isolation and multi-version concurrency control works in detail. The transactional manager provides start timestamps for all transactions (read-only and update transactions) that start, and commit timestamps for update transactions (i.e., transactions that change one or more rows) that are going to commit because they completed. The start timestamp is guaranteed to observe a consistent database state according to snapshot isolation. When a transaction starts it is associated with a start timestamp. The transaction will observe all rows with the highest commit timestamp that has a commit timestamp equal or lower than the start timestamp of the transaction. When a row is updated, the row is read by means of the primary key and the update is performed on a private version (a copy not visible to any other transaction, but the transaction that created it) initialized with the contents of the row just read. When a row is deleted, a tombstone version is created with the key of the row and indicating that the row is deleted. The tombstone version is labeled with the commit timestamp as any other row version. When a row is inserted is stored as a private version. If the transaction is going to commit, then the transaction gets assigned a commit timestamp that is used to label the private versions. The set of all private versions (inserted, updated and/or deleted rows) of a transaction is also called a writeset. The writeset is logged to guarantee its durability. When the logging is completed the transaction is said to be durable. The private versions are then made public so any transaction with a start timestamp equal or lower than the commit timestamp will be able to observe these updates.

In multi version concurrency control, two transactions are said to be concurrent when one of them has its start commit timestamp between the start and commit timestamps of the other one or both are started but not yet committed. That is, if transaction t1 has committed and has start and commit timestamps, st1, ct1, and transaction t2 is uncommitted and has start timestamp st2, they are said to be concurrent if st1>st2>ct1. If t1 and t2 are both started but uncommitted at any given time, they are both concurrent. Two transactions that are concurrent and insert/update/delete the same row are said to be conflicting or having a write-write conflict. When two transactions have a write-write conflict one of them should be rollbacked to guarantee isolation. If one was already committed, it will be the uncommitted one that will be rollbacked, if none are committed any of the two can be rollbacked. There are two typical strategies for solving write-write conflicts in multi version concurrency control, that is, choosing which transaction to rollback: first updater wins and first committer wins. In the first updater wins strategy, the first transaction that updates the row (first one to be processed by the conflict manager) will be the one that will commit, and the other will be rollbacked. In the first committer wins strategy, the first transaction that tries to commit will do so and the other will be rollbacked.

Snapshot isolation owes its popularity because it removes the read-write conflicts introduced by serializability. However, there are still a number of applications that exhibit hotspots (i.e., contention at a small fraction of the rows highly accessed in a conflictive manner) with snapshot isolation. They are applications in which some data items are updated very frequently by concurrent transactions. In this case, snapshot isolation is not sufficient because too many write-write conflicts are generated causing the rollback of many transactions. Serializability is even worse because it creates a huge contention and can even add more conflicts due to read-write conflicts. A large class of these applications are those that maintain aggregated values that need to be updated as part of a transaction. This means that there will be many concurrent transactions trying to update the rows holding the aggregated values, also called aggregation rows. If there are several of such transactions running concurrently, because they are updating the same row, they will generate write-write conflicts that will lead to the rollback of all of them but one under snapshot isolation. Under serializability, traditional read-write locking creates a huge contention point at each of the rows where aggregations are computed that can also lead to many deadlocks that result in rollbacking many transactions.

An example of the aforementioned aggregate hotspot would be an application that keeps a sales table and a set of additional aggregate tables. The sales table uses one row per each performed sale with data about the geography of where the sale was performed, amount of the sale and other relevant data about the sale. Then, there are several tables one per aggregation level for the geography of the sale, namely, district, city, province, region and country. Each aggregation table has as keys the entities it refers to, namely, districts, cities, provinces, regions, and countries. Each transaction for a sale, will insert a row in the sales table and will increment the relevant row in the different aggregation tables in the amount of the sale. This table structure enables to perform aggregation analytical queries very efficiently since it requires just to read a single row from the relevant aggregation table. For instance, to query the sales in Madrid, it just requires reading the value associated to the key Madrid in the province table. However, updates are troublesome using traditional concurrency control since there will be many write-write conflicts at the aggregation table rows, the higher the level the aggregation, the higher the level of write-write conflicts. In particular, at the level of country, any national sale being recorded concurrently on the database will result in a write-write conflict.

The above pain in existing applications gets exacerbated when the application is data intensive and needs to scale out the data store, using multiple computing nodes to share the load processed by the data store.

In the present invention, a new system for performing concurrency control in transactional data stores are proposed to overcome this pain.

The invention describes a conflict-less system for reading, inserting, updating, deleting and recovering single-versioned and multi-versioned data providing two different isolation levels. The invention is agnostic at how the data management system is architected and what functionalities it provides. The invention provides the system for handling in conflict-less manner the single-versioned data and multi-versioned data.

DESCRIPTION OF THE INVENTION

The invention solves how to aggregate data in a conflictless manner in a transactional system extending concurrency control in a cost-effective manner by storing rows in the data store engine combining value rows and a new kind of rows, operation rows, and substituting the operation rows into value rows only after a snapshot that includes them is known to be visible, and before they are read. The invention also handles how to perform recovery. The invention provides different isolation levels snapshot isolation in the case of pure multi-versioned data and another isolation level that is close to read committed. For the read committed isolation level it becomes possible to keep just a single version of the data, thus resulting in lower memory pressure.

The present invention provides an alternative solution for the aforementioned problems, by a transactional semantic concurrency control system according to claim 1. In dependent claims, preferred embodiments of the invention are defined.

The invention provides a transactional semantic concurrency control system for managing a database, wherein
the system comprises a data store engine which is adapted
to manage the database comprising rows, and each row comprising at least a primary key uniquely identifying each row, and
wherein a first type of row is a value row comprising at least one semantic column, being the semantic column a column of any type which is modified by any set of operations that all commute among them and a commit timestamp and,
wherein a second type of row is an operation row, comprising at least one operation to be applied over at least one semantic column of a value row identified by the primary key and a commit timestamp;
wherein the data store engine is further adapted to:
manage operation rows;
store the value rows and the operation rows;
generate an operation row when it receives an operation that inserts, updates, upserts, and/or deletes a row of the database with the commit timestamp of the operation; and
apply the operations of at least one operation row when a trigger condition is satisfied.

Throughout all this document, "data store engine" will be understood as a component that manages operations over the data stored in a database. A data store engine can be distributed and there might be multiple instances of the data store engine. Each data store engine instance (also known as data manager) manages a subset of keys, that is, it is responsible for operations over data which keys belong to the subset it is responsible for.

Throughout all this document, "value row" will be understood as a row in a table of the database representing a set of related data. Each value row comprises a primary key, at least a semantic column and a commit timestamp.

Throughout all this document, "primary key" will be understood as the unique identifier of each row of the table. Throughout all this document, "commit timestamp" will be understood as the timestamp (typically an integer counter incremented with the commit of each transaction) when a transaction is committed in the database.

A "semantic column" will be understood as a column of any type in the table which is modified by any set of operations that all commute among them.

The invention considers sets of mutually commutative column operations to avoid conflict checking. It can be combined with operations that are not commutative by introducing the relevant concurrency control for them. The invention deals with conflictless tables. It can be combined with regular tables that keep traditional concurrency control.

All operations over a conflictless column commute. An example is any numeric type with addition and subtraction as operations that are both commutative. Another example is any numeric type with product and division (excluding division by 0). Another operation is to keep the maximum value (or minimum value) between the current value of the column and the new value added. Or a bag with operations to add and remove an element from/to the bag and get the current set of elements in the bag. It can also be used with operations that do not always commute but the resulting semantics is satisfactory. This is many times the case with a set of operations to insert/remove elements and get the current set of elements. Insert and remove elements only commute when they work on different elements, but for many applications the case in which the operations do not commute, an insert and a delete over the same element when they happen in parallel is because any ordering between them is right. This new kind of commutativity enables to avoid concurrency control at all, resulting in high levels of efficiency for high update rates.

A data store engine handles two kinds of rows, value rows and operation rows, and it can store the data either locally or remotely. When a transaction commits it generates operations rows. Throughout all this document, "operation row" will be understood as a row that contains operations to be applied over one or more semantic columns of a table in the database. The operation rows comprise a primary key identifying the value row over which the operations are applied and the commit timestamp of the transaction that performed the operation.

When an operation as an insert, update, upsert or delete is received, the data store engine generates an operation row with the commit timestamp of the operation. The operations contained in the operation rows are applied gradually over the corresponding value rows when some conditions are met.

Operation rows are used in combination with traditional value rows. The invention exploits two kinds of rows in order to avoid having to define inverse operations for commutative data types to guarantee atomicity that requires to undo the effects of rollbacked transactions. Traditional commutative locking has this requirement in order to be able to undo the effects of rollbacked transactions.

In regular MVCC, a row with a given key can only be updated by a transaction at a time. If two concurrent transactions insert/update/delete the same row (i.e. insert/update/delete a row with the same key), then one of them has to be rollbacked. In the present invention, operation rows are introduced that work over semantic concurrency control columns to avoid this problem.

In a particular embodiment, the data store engine is further adapted to provide for a plurality of tables of the database:
snapshot isolation level, or
read committed isolation level, or
a combination of them.

The invention deals with two levels of isolation. The first one is snapshot isolation. The other level is read committed isolation. Snapshot isolation splits logically the transaction execution in two points, the start of the transaction where all reads happen logically and the end of the transaction where all the writes happen logically. In snapshot isolation reads are performed on the snapshot at which the transaction started, that is, at the start timestamp. In read committed the reads are performed on the last substituted value row.

In a particular embodiment, the data store engine is adapted to receive the following operations to manage the database:
read a row with a primary key at a given snapshot with snapshot isolation;
read a set of rows within a range of primary keys at a given snapshot with snapshot isolation;
read a row with a primary key with read committed isolation;
read a set of rows within a range of primary keys with read committed isolation;
insert, update, or upsert a row with a primary key and a given commit timestamp, if the row does not exist the value row generated is computed by applying the update over a default value row with default values in the columns;
the insert behaves like an upsert, but it is only executed if the primary key does not exist in the table;
the update behaves like an upsert, but it is only executed if the primary key already exists in the table;
delete a row with a primary key and a given commit timestamp, wherein the delete operation generates a tombstone value row indicating that the row ceases to exist from that commit timestamp.

The data store engine is adapted to receive the previous operations. A read operation can be received for reading a single row or a set of rows given a range of primary keys. Both read operations can happen with snapshot isolation and with read committed isolation. Under read committed isolation, read operations read the latest value row, that is, the one with highest commit timestamp. Under snapshot isolation reads however can happen at any snapshot.

Throughout all this document, "snapshot" will be understood as a static view of the database at a precise moment of time.

Upsert operation works like an insert if no row exists or as an update if the row exists. Delete operation simply deletes a row with a given primary key if it exists otherwise has null effect. Upsert operations and delete operations do not conflict. If an upsert operation happens just after a delete operation, it will just behave as an insert operation. If delete operation happens after an upsert operation the row will be deleted. Inserts and updates can be implemented using read and upsert. Upsert of particular values can also be emulated combining delete with upsert.

If an upsert operation with a primary key is executed at a commit timestamp, and at the snapshot with the same value as the commit timestamp the row with the same primary key does not exist (i.e., it was never inserted or deleted), the update is executed as an update over a default row with default values in all columns.

A regular insert or update can be implemented by combining a read with the upsert. The read operation will check whether the row exists or not and then depending on the result the upsert is executed or not. In the case of an insert it will be checked that the row does not exists and in the case on an update it will be checked that the row exists. In this way, the traditional semantics of insert and update can also be easily enforced.

Non-read operations are serialized in the order of their commit timestamps as in snapshot isolation.

Delete operations are considered non-conflictive. It means that they are considered as they do not conflict with any upserts. If two transactions are concurrent and one executes an upsert and the other executes a delete over the same key, there are two cases. The transaction doing the upsert has a higher commit timestamp than the delete, the upsert is executed over the default row. If the transaction doing the update has a commit timestamp lower than the one doing the delete, it simply applies the upsert over the row that will be deleted afterwards by the other transaction.

A delete operation generates a delete operation row. When it is converted into a value row, it is converted into a tombstone value row that indicates that no row exists at that commit timestamp.

The invention assumes that once a snapshot is reached implicitly by a read operation or explicitly by a snapshot notification, later insert, update, upsert operations and delete operations will bring commit timestamps higher than the latest notified snapshot. Insert, update, upsert operations and delete operations can arrive in an order different from their commit timestamps.

There is no conflict checking at all since all operations are conflictless. The invention enhances snapshot isolation semantics by enabling executions that would lead to transaction rollbacks in traditional snapshot isolation In a particular embodiment, the data store engine is adapted to:
  receive a read operation;
  determining a target snapshot wherein
    if the read operation is with read committed isolation the target snapshot is the current one, otherwise the target snapshot is the provided in the read operation;
    keep the value of the highest known snapshot as the maximum among all the snapshots received, being initially zero;
  upon the reception of a read operation, checking whether the target snapshot of the read operation is higher than the highest known snapshot wherein
    if the checking is positive, the data store engine is adapted to trigger a substitution process over all the operation rows with commit timestamp lower or equal to the target snapshot of the read operation, once the substitution process is completed, the read operation is executed and if the read operation is with snapshot isolation the highest known snapshot is updated to the received snapshot,
    if the checking is negative, it is adapted to execute the read operation at the target snapshot;
  retrieving the value row or value rows with the primary keys of the read operation.

Throughout all this document, "target snapshot" will be understood as the snapshot that is intended to be read. In read committed isolation the target snapshot is the current one because read operations read the latest value row, whereas in snapshot isolation the target snapshot is the one included in the read operation because reads can happen at any snapshot.

Throughout all this document, "the highest known snapshot" will be understood as the maximum snapshot received. Initially, its value is zero.

If the target snapshot is higher than the highest known snapshot it means that there are operation rows with lower or equal commit timestamp whose operations should be applied over the corresponding value rows before the read operation at the target snapshot is executed. In this case, the data store engine triggers a substitution process over these operations row with commit timestamp lower or equal than the target snapshot.

Advantageously, a set of operation rows can be maintained stored without being executed until a snapshot higher or equal than the commit timestamp of the operation row is received.

In a particular embodiment, the data store engine is further adapted to:
  receive a snapshot notification;
  upon the reception of a snapshot notification, being the snapshot received higher than the highest known snapshot, the data store engine is adapted to trigger the substitution process over the operation rows with commit timestamp lower or equal to the snapshot received, the substitution process can be executed over none, one or more operation rows in the order of their commit timestamp, and the highest known snapshot is updated to the received snapshot in the notification.

Throughout all this document, "snapshot notification" will be understood as a notification received by the data store engine to advance the highest known snapshot.

In this embodiment, "the highest known snapshot" will be understood as the maximum snapshot received either by read operations or snapshot notifications.

The highest known snapshot can be updated explicitly through a snapshot notification or implicitly by reading from a particular snapshot. When the highest known snapshot reaches a value, it also means that new operation rows being added or rows being deleted will have a commit timestamp higher than this snapshot. Snapshot explicit notifications provide values that are monotonically increasing.

When the system is started, it is started at a particular snapshot and it is like before processing any operation an explicit snapshot notification happened with that snapshot value.

The data store engine receives the advancement of the snapshot either explicitly through a notification mechanism or implicitly through the snapshot at which reads are requested and handles the substitution process.

If the snapshot received is higher than the highest known snapshot, the highest known snapshot will be updated to the received snapshot in the notification.

An operation row can be substituted by a value row after it is known that the highest known snapshot is equal or higher than the commit timestamp of the operation row. Delete operations are also applied as part of the substitution process.

In a particular embodiment, this substitution can happen:
  As early as the timestamp corresponding to the highest notified snapshot in a snapshot notification is equal or higher than the row commit timestamp.
  As late as a read operation has to read the version of the row corresponding to an operation row. At this point it is sure that there are no gaps till the row that is being read, so then all the value rows till the row being read can be computed with snapshot isolation consistency guarantees.
  At any time between the two above events.

The updated rows become public when committing the transaction and at the same time they become visible because the current snapshot takes the value of the commit timestamp use to label the just committed transaction. But it is also able to deal with a more advanced multi-versioning where making the updates public is decoupled from the advancement of the snapshot. This decoupling enables the transactional system to process many transactions in parallel and be highly scalable. Since the latter case it is more general and includes the traditional multi-versioning, the invention deals with it by treating separately the insertion of updates in the form of operation rows (i.e., making updates public) and the advancement of the snapshot that happens either explicitly through a notification mechanism or implicitly through the snapshot (also known as start timestamp) at which reads are requested.

In a particular embodiment, the system is a multi-version system adapted to store for each primary key multiple rows, each row being a different version labelled with a different commit timestamp, wherein the substitution process triggered by the data store engine is an iterative process over the operation rows with a commit timestamp lower or equal than the new highest snapshot, said substitution process comprising the following steps that are performed for each primary key:
- identify the value row with the same primary key and the highest commit timestamp, if it does not exist a default row with default values is generated;
- identify the operation row with the same primary key and the lowest commit timestamp, if there are two or more with the same timestamp taking first the one that was first inserted;
- if the identified operation row with lowest commit timestamp is an insert, an update or an upsert operation then a new value row with the same commit timestamp of the identified operation row is generated, the operations on the identified operation row are applied over the values of the corresponding columns in the identified value row with highest commit timestamp and the result is stored in the corresponding column of the new generated value row, and the identified operation row is substituted by the new generated value row;
- if the identified operation row with the lowest commit timestamp is a delete operation, the delete operation row is substituted by a tombstone row with the same primary key and the commit timestamp of the delete operation.

In multi-version a new version of the row is created labeled with the commit timestamp assigned to the transaction that inserted, updated, upserted or deleted the row. As a result, multiple versions of the same row might exist with different commit timestamps.

Operation rows are transformed gradually into value rows according a substitution process described above. Value rows only contain values of columns. Both operation rows and value rows are labeled with commit timestamps.

A data store engine processes the operations over the data generating new versions of the rows. Therefore, a data store engine manages the versions of the data which keys belong to the subset it is responsible for. A transaction operation sees the version of each row it reads corresponding to the assigned snapshot to the operation.

The substitution process, according to an embodiment, is an iterative process consisting in the modification of the operations rows with a timestamp lower or equal than the highest known snapshot into value rows with the same commit timestamp. This process is performed for each primary key that has operation rows lower or equal than the target snapshot to generate.

In multi-version, each operation row is substituted by a new generated value row with the same commit timestamp. In the new value row, the result of the operations of the operation row applied over the corresponding values of each column of the value row with the highest commit timestamp is stored in each column.

In a particular embodiment, the data store engine is adapted to receive a recovery of an operation row and search for a value row with the same primary key and the highest commit timestamp, wherein
- if the commit timestamp of the selected value row is equal or higher than the commit timestamp of the given operation row, the recovery of the row is ignored,
- otherwise, a new value row with the same commit timestamp as the given operation row is generated, the operations on the given operation row are applied over the values of the corresponding columns in the selected value row with the highest commit timestamp and the result is stored in the corresponding column of the new generated value row, if the value row does not exist or it is a tombstone value row a default row with default values is generated.

In a particular embodiment, the data store engine is adapted to receive a recovery of a delete operation and search for a value row with the same primary key and highest commit timestamp, wherein
- if the commit timestamp of the selected value row is equal or higher than the commit timestamp of the given delete operation, the recovery of the row is ignored,
- otherwise, a tombstone value row is generated with the same primary key and the same commit timestamp as the given delete operation and the delete operation is substituted by the generated tombstone value row, if no value row exists with that primary key, the generation of the tombstone row can be omitted.

In a particular example, logging can be performed for update transactions (transactions that alter the database) to provide durability as follows:
- The writeset of the transaction is logged in durable storage with the information necessary to reproduce the operation rows in case of recovery.
- If several operation rows affect the same column of the same row, the order in the writeset is the order in which they should be applied.

After a failure of some components, there are transactions that need to be redone, because their effects might have been lost before they were persisted. For this purpose, the log is traversed searching for all log records with a commit timestamp higher than a certain value that guarantees that earlier updates are already reflected in the persisted state of the data store. Log records only contain operation rows or information able to reconstruct them. The operation rows are replayed. To guarantee consistency, idempotence of updates that were already persisted and are being redone should be preserved. Thanks to multi-versioning, the idempotence can be preserved by discarding the redo of operations that are already reflected in the state of the data store. When an operation row that is being redone is already in the data store with the same commit timestamp, it is discarded. If the commit timestamp of the operation row being redone is lower than the commit timestamp of a value row with the same key in the data store, the operation row being redone is discarded. At the end of the recovery, the highest commit timestamp observed becomes the current snapshot. From that moment, the data store engines can convert all operation rows into value rows. When an update is performed over a row key that does not yet exist, that is an operation row is inserted, the row is considered to exist as a default value with default values for all the columns. The default values are defined when defining the schema of the table. The operation row then it is applied over the columns for which it has operations on this default row.

In a particular embodiment, in a table of the database that only supports the read committed isolation level, the data store engine is adapted to maintain a single value row for each primary key resulting in a single versioning system.

With read committed isolation level it is possible to be more efficient in space. If it is the only isolation level supported for a table, then it becomes possible to maintain a single value row per key thus, resulting in single versioning.

In a particular embodiment, the substitution process triggered by the data store engine is an iterative process over the operation rows with a commit timestamp lower or equal than the new highest known snapshot, said substitution process comprising the following steps that are performed for each primary key:
  identify the value row with the same primary key, if it does not exist a default row with default column values is generated becoming the identified value row;
  identify the operation row with the same primary key and the lowest commit timestamp, if there are two or more with the same timestamp taking first the one that was first inserted;
  if the identified operation row with lowest commit timestamp is an insert, an update or an upsert operation then
    the identified value row with the same primary key is modified, the operations on the operation row are applied over the values of the corresponding columns in the identified value row and the result is stored in the corresponding column of the identified value row, the identified value row gets the same commit timestamp of the identified operation row and the identified operation row is removed, or
    a new value row with the same commit timestamp of the identified operation row is generated, the operations on the identified operation row are applied over the values of the corresponding columns in the identified value row and the result is stored in the corresponding column of the new generated value row, the previous identified value row is deleted and the identified operation row is removed;
  if the identified operation row with the lowest commit timestamp is a delete operation, the identified value row with the same primary key is deleted, and the delete operation is removed.

In this embodiment, a single value row is maintained per key.

Therefore, in the substitution process, if the operation row is an insert, update or upsert operation there are two options: the substitution process does the substitution over the single value row kept per key or deletes the previous value rows. In the first one, instead of generating a new value row per operation row, the operations of the operation row are applied over the corresponding values in the identified value row with the same primary key and the value row gets the same commit timestamp of the operation row. In the second one, when substituting an operation row, a new value row can be generated to store the results of the operations in the operation row applied over the values of the value row with the same primary key and the previous value row is deleted in order to maintain a single value row per key.

In this embodiment, with a delete operation the value row with the same primary key is deleted instead of generating a tombstone row as in the multi-version case.

In a particular embodiment, at least two operation rows are combined into a single operation row when the highest notified snapshot is higher than the commit timestamps of the at least two operation rows.

In this embodiment, it becomes possible to combine the operation rows among them given certain conditions.

Two operation rows can be combined together into a single operation row whenever the highest notified snapshot is higher or equal than the commit timestamps of both operation rows. This is especially interesting in the cases where the combination of two operations is as compact as for a single operation, for instance, with addition, multiplication or maximum/minimum. Then a new operation row is produced that for each column contains:
  If the column only appears in a single operation row, then it will contain the operation in that column of that operation row.
  If the column appears in the two operation rows, then it will contain the aggregation of the two operations. For instance, if one is sum 5 and another sum 7, the new column will contain sum 12.

Advantageously, the memory occupation of the operation rows can be reduced.

In a particular embodiment, at least two operation rows are combined into a single operation row when it is known that no snapshot will be ever read between the commit timestamp of the two operation rows.

In this embodiment, it is exploited the knowledge that certain snapshots will never be read, thus, two operation rows that cannot have a snapshot in between their respective commit timestamps can be combined to reduce their space consumption since the value row that will not be generated will never be read. This approach is especially advantageous when there are many operation rows that can be combined.

In a particular embodiment, the value rows are stored in a table of the database and the operation rows can be stored:
  in another table of the database, or
  in memory, or
  in a hybrid manner in the table of the database storing the value rows and the operation rows, or
  any combination of the above.

In a system according to the previous embodiment, operation rows and value rows might be stored in a different way. In some cases, the value rows are stored in the database and the operation rows are stored in another table of the database.

In some cases, the operation rows can be kept in a cache, while value rows are stored in the persistent storage. In such systems the substitution process might be performed on demand when a read operation is received or when the cache of updates is propagated.

In a particular embodiment, the data store engine is adapted to manage a garbage collection condition, wherein if a value row that is the last version for a key has a commit timestamp below the start timestamp of the oldest transaction active in the system, it can be removed.

For some value rows with a given primary key it is known that they can never be read because the transaction with the oldest start timestamp has a start timestamp higher than the commit timestamp of a value row with a commit timestamp higher than those value rows. These value rows can be removed/garbage collected since no transaction will ever read them. The invention is agnostic to the process of garbage collection of value rows, it is agnostic at how obsolete row versions are garbage collected and how rows are actually stored and cached.

DESCRIPTION OF THE DRAWINGS

These and other features and advantages of the invention will be seen more clearly from the following detailed description of a preferred embodiment provided only by way of illustrative and non-limiting example in reference to the attached drawings.

FIG. 1 This figure shows a schematic table of the database that shows how the value rows of the table evolve throughout the example described.

FIG. 2 This figure shows a schematic table comprising the operation rows that are generated in chronological order throughout the example.

DETAILED DESCRIPTION OF THE INVENTION

The table of FIG. 1 shows how the value rows evolve through the example.

FIG. 2 show a table with all the operation rows that are generated in chronological order. Each row of the table corresponds to an inserted operation row, either upsert or delete. The column called "step added" indicates in which step of the example the operation row was added. The column called "step substituted" tells in which step of the example the substitution into value row took place.

An example of how the invention works is provided below. In the example it is described how the data store engine manages multi-versioning and how it interacts with the other functionalities to achieve semantic concurrency control.

The data store engine handles sets of tables, each of them containing zero or more rows. Tables are organized in rows. Rows have a set of columns. Each row is identified by a primary key that consists of one or more columns. Columns that do not appear in the upsert operation are not modified and keep the value they had in the snapshot corresponding to the transaction enclosing the upsert operation.

Semantic concurrency control columns are updated with an upsert operation, but the value in the upsert operation for such columns is considered the value to be added to the current value of the column.

In the example the rows of the table in FIG. 1 comprises three columns that are integer numbers. The first column is the primary key (pk), and the other two columns (c1, c2) are commutative columns that contain aggregate values associated to the key. The commit timestamp of the row is denoted with cts. Additive operations are considered over c1 and c2. The default value for c1 and c2 is 0. The table contains initially 2 rows with the following content (pk=1, c1=10, c2=20, cts=1), (pk=10, c1=15, c2=25, cts=2). The current snapshot (sn) is 2.

In the following sequence of steps a set of operations are gradually received and it is explained how the process works.

1. Read rows with 1<=pk<=10 at sn=2. The read returns these two rows: (pk=1, c1=10, c2=20, cts=1), (pk=10, c1=15, c2=25, cts=2)
2. Read row with pk=9 at sn=2. No row is returned since there is no row yet with that key at any snapshot.
3. Add operation row (pk=9, add(col1, 5), add(col2, 10), cts=3).
4. Read row with pk=9 at sn=2. The read does not return any row.
5. Read row with pk=9 at sn=3. There are no other rows with the same primary key. It is considered that there is a default value row: (pk=9, col1=0, col2=0) to compute the value for this operation row. The substitution process is executed between this default value row and the operation row (pk=9, add(col1, 5), add(col2, 10), cts=3). The value row (pk=9, col1=5, col2=10, cts=3) is produced and substitutes the operation row with cts=3.
6. Add operation row (pk=9, add(col1, 15), add(col2, 25), cts=8). The row is added. The substitution process cannot be triggered.
7. Read row with pk=9 at sn=3. Returns the value row with cts=3, (pk=9, col1=5, col2=10, cts=3).
8. Add operation row with (pk=9, add(col1, 15), add(col2, 25), cts=4). The row is added. Although it has a lower cts than the last added row that had cts=8.
9. Read row with pk=9 at sn=3. Returns the value row with cts=3, (pk=9, col1=5, col2=10, cts=3). Rows with higher commit timestamps (cts=8, cts=4) than current snapshot (sn=3) are invisible due to snapshot isolation semantics.
10. Read row with pk=9 at sn=4. The snapshot advances implicitly to 4 due to the read operation. The substitution process is triggered to process the read operation. It can only transform the operation row with cts=4 to a value row. Other operation rows cannot be substituted (the one with cts=8). The following value row is generated: (pk=9, col1=20, col2=35, cts=4) and substitutes the operation row with cts=4. The read operation returns this value row.
11. Add operation row with (pk=9, add(col2, −10), cts=14). The row is added. The substitution process cannot be triggered yet.
12. Add operation row with (pk=9, add(col1, 20), cts=10). The row is added. The substitution process cannot be triggered yet.
13. Read row with pk=9 at sn=9. The read operation sets implicitly the snapshot to 9 and triggers the substitution process that process the row with cts=8, then only one with cts <=9, the current snapshot. The process generates the value row (pk=9, col1=35, col2=60, cts=8) and substitutes the operation row with cts=8.
14. Notification sn=19. Now the snapshot is explicitly set to 19. Now the substitution process can either do nothing, or substitute operation row with cts=10, or substitute operation rows with cts=10 and cts=14. In the example it is taken the second option that substitutes only the operation row with cts=10. Now the operation row with cts=10 is substituted by the following value row (pk=9, col1=55, col2=60, cts=10).
15. Read row with pk=9 at sn=1. The snapshot does not change. At snapshot 1 there was no row with pk=9, so the read operation does not return any row.
16. Read row with pk=9 at sn=7. The row that corresponds to snapshot 7 with pk=9 is the one with cts=4 that is the one with highest cts lower or equal to 7. The read returns the value row (pk=9, col1=20, col2=35, cts=4)
17. Read row with pk=9 at sn=19. This read forces to generate snapshot 19 and to substitute the operation row with cts=14 to the value row: (pk=9, col1=55, col2=50, cts=14). The read returns this produced value row.
18. Read row with pk=9 at sn=20. The snapshot is set implicitly to 20. No substitution can happen. The read returns the value row with cts=14: (pk=9, col1=55, col2=50, cts=14)
19. Read rows with 1<=pk<=10 at sn=2 returns these two value rows: (pk=1, c1=10, c2=20, cts=1), (pk=10, c1=15, c2=25, cts=2).
20. Read rows with 1<=pk<=10 at sn=3 returns these three value rows: (pk=1, c1=10, c2=20, cts=1), (pk=10, c1=15, c2=25, cts=2), (pk=9, col1=5, col2=10, cts=3).

21. Read rows with 1<=pk<=10 at sn=14 returns these three value rows: (pk=1, c1=10, c2=20, cts=1), (pk=10, c1=15, c2=25, cts=2), (pk=9, col1=55, col2=50, cts=14)
22. Add operation row (pk=1, add(col1, 5), add(col2, 10), cts=23). The operation row is added.
23. Add operation row (pk=10, add(col2, 10), cts=22). The operation row is added.
24. Add operation row (pk=10, add(col2, 10), cts=25). The operation row is added.
25. Delete row pk=1, cts=22. The delete operation is added.
26. Read rows 1<=pk<=10 at sn=21. The snapshot advances implicitly to the value 21. It returns the rows: (pk=1, c1=10, c2=20, cts=1), (pk=10, c1=15, c2=25, cts=2), (pk=9, col1=55, col2=50, cts=14)
27. Read rows 1<=pk<=10 at sn=22. The snapshot is advanced implicitly to 22. The substitution process is triggered and the operation row with cts=22 and delete operation with cts=22 are processed. First the operation row with pk=10 is transformed into a value row applying to operations to the value row with cts=2. The value row (pk=10, c1=15, c2=35, cts=22) substitutes the operation row with cts=22. The delete operation is the next one processed by the substitute process. It converts the delete operation into a tombstone row tombstone (pk=1, cts=22).
28. Read rows 1<=pk<=10 at sn=23. The snapshot is advanced implicitly to 23. The substitution process is triggered and operation row with cts=23 is converted into a value row. Since at snapshot 23 the row with pk=1 does not exist (due to tombstone with cts=22), the operation row is applied over the default row with default values of 0 for col1 and col2. The generated value row is (pk=1, col1=5, col2=10, cts=23) that substitutes the operation row. The read operation returns the rows: (pk=1, col1=5, col2=10, cts=23),), (pk=10, c1=15, c2=35, cts=22), (pk=9, col1=55, col2=50, cts=14)
29. Add operation row (pk=9, add(col1, 5), cts=24). The operation row is added.
30. Insert operation row (pk=1, add(col1, 5), add(col2, 10), cts=27). The operation row is added.
31. Delete row pk=9, cts=25. The delete operation is added.
32. Add operation row (pk=1, add(col1, 5), add(col2, 10), cts=25). The operation row is added.
33. Add operation row (pk=10, add(col2, 10), cts=28). The operation row is added.
34. Read rows 1<=pk<=10 at sn=25. The snapshot advances implicitly to 25. The substitution process iterates over the operation rows/delete operations (pk=9, add(col1, 5), cts=24), (pk=10, add(col2, 10), cts=25), (pk=1, add(col1, 5), add(col2, 10), cts=25), Delete row pk=9, cts=25. It starts with operation row (pk=9, add(col1, 5), cts=24). The value row considered is (pk=9, col1=55, col2=50, cts=14). The new value row substituting the operation row is (pk=9, col1=60, col2=50, cts=24). For pk=10, it considers the value row (pk=10, c1=15, c2=35, cts=22) and generates the value row (pk=10, c1=15, c2=45, cts=25) that substitutes the operation row with pk=10 and cts=25. For pk=1 the value row (pk=1, col1=5, col2=10, cts=23) is considered and the new generated value row is (pk=1, col1=10, col2=20, cts=25) that substitutes the operation row with pk=1 and cts=25. Finally, the delete operation is processed with cts=25 that generates the tombstone row (pk=9, cts=25). The read operation returns: (pk=1, col1=10, col2=20, cts=25), (pk=10, c1=15, c2=45, cts=25).
35. Read rows 1<=pk<=10 at sn=28. The snapshot advances implicitly to 28. The substitution process transforms the operation rows: (pk=1, add(col1, 5), add(col2, 10), cts=27), (pk=10, add(col2, 10), cts=28). For pk=1 the value row considered is (pk=1, col1=10, col2=20, cts=25) and generates the value row (pk=1, col1=15, col2=30, cts=27). For pk=10 the value row considered is (pk=10, c1=15, c2=45, cts=25) and the value row generated is: (pk=10, c1=15, c2=55, cts=28). The rows returned by the read are: (pk=1, col1=15, col2=30, cts=27), (pk=10, c1=15, c2=55, cts=28).
36. Read rows 1<=pk<=10 at sn=30. The snapshot advances implicitly to 30. No substitution process can take place since there are no outstanding operation rows or delete operations and the returned rows are: (pk=1, col1=15, col2=30, cts=27), (pk=10, c1=15, c2=55, cts=28).

The invention claimed is:
1. A computer based transactional Semantic Concurrency Control System for managing a database, wherein
the system comprises a data store engine which is adapted to manage the database comprising rows, and each row comprising at least a primary key uniquely identifying each row, and
wherein a first type of row is a value row comprising at least one semantic column, being the semantic column a column of any type which is modified by any set of operations that all commute among them and a commit timestamp and,
wherein a second type row is an operation row, comprising at least one operation to be applied over at least one semantic column of a value row identified by the primary key and a commit timestamp;
wherein the data store engine is further adapted to:
manage operation rows;
store the value rows and the operation rows;
generate an operation row when it receives an operation that inserts, updates, upserts, and/or deletes a row of the database with the commit timestamp of the operation; and
apply the operations of at least one operation row when a trigger condition is satisfied;
wherein the data store engine is further adapted to:
read a row with a primary key at a given snapshot with snapshot isolation;
read a set of rows within a range of primary keys at a given snapshot with snapshot isolation;
read a row with a primary key with read committed isolation;
read a set of rows within a range of primary keys with read committed isolation;
insert, update, or upsert a row with a primary key and a given commit timestamp, if the row does not exist the value row generated is computed by applying the update over a default value row with default values in the columns;
the insert behaves like an upsert, but it is only executed if the primary key does not exist in the table;
the update behaves like an upsert, but it is only executed if the primary key already exists in the table;
delete a row with a primary key and a given commit timestamp, wherein the delete operation generates a tombstone value row indicating that the row ceases to exist from that commit timestamp;
wherein the system is a multi-version system adapted to store for each primary key multiple rows, each row being a different version labelled with a different commit timestamp, wherein the substitution process triggered by the data store engine is an iterative process over the operation rows with a commit timestamp lower or equal than the new highest snapshot, said substitution process comprising the following steps that are performed for each primary key:
identify the value row with the same primary key and the highest commit timestamp, if it does not exist a default row with default values is generated;
identify the operation row with the same primary key and the lowest commit timestamp, if there are two or more with the same timestamp taking first the one that was first inserted;
if the identified operation row with lowest commit timestamp is an insert, an update or an upsert operation then a new value row with the same commit timestamp of the identified operation row is generated, the operations on the identified operation row are applied over the values of the corresponding columns in the identified value row with highest commit timestamp and the result is stored in the corresponding column of the new generated value row, and the identified operation row is substituted by the new generated value row;
if the identified operation row with the lowest commit timestamp is a delete operation, the delete operation row is substituted by a tombstone row with the same primary key and the commit timestamp of the delete operation;
wherein the data store engine is further adapted to provide for a plurality of tables of the database:
snapshot isolation level, or
read committed isolation level, or
a combination of them;
wherein the data store engine is further adapted to:
receive a read operation;
determining a target snapshot, a snapshot being a static view of the database at a precise moment of time and a target snapshot being the snapshot that is intended to be read; wherein
if the read operation is with read committed isolation the target snapshot is the current one, otherwise the target snapshot is the provided in the read operation;
keep the value of a highest known snapshot as the maximum among all the snapshots received, being initially zero;
upon the reception of a read operation, checking whether the target snapshot of the read operation is higher than the highest known snapshot wherein
if the checking is positive, the data store engine is adapted to trigger a substitution process over all the operation rows with commit timestamp lower or equal to the target snapshot of the read operation and, once the substitution process is completed, the read operation is executed and if the read operation is with snapshot isolation the highest known snapshot is updated to the snapshot associated to the read operation,
if the checking is negative, the data store engine is adapted to execute the read operation at the target snapshot;

retrieving the value row or value rows with the primary keys of the read operation;
and wherein the data store engine is further adapted to:
receive a snapshot notification, the snapshot notification being a notification received by the data store engine to advance the highest known snapshot;
upon the reception of a snapshot notification, being the snapshot received higher than the highest known snapshot, the data store engine is adapted to trigger the substitution process over the operation rows with commit timestamp lower or equal to the snapshot received, the substitution process can be executed over none, one or more operation rows in the order of their commit timestamp, and the highest known snapshot is updated to the snapshot associated to the read operation in the notification.

2. A system according to claim 1, wherein the data store engine is adapted to receive a recovery of an operation row and search for a value row with the same primary key and the highest commit timestamp, wherein
if the commit timestamp of the selected value row is equal or higher than the commit timestamp of the given operation row, the recovery of the row is ignored,
otherwise, a new value row with the same commit timestamp as the given operation row is generated, the operations on the given operation row are applied over the values of the corresponding columns in the selected value row with the highest commit timestamp and the result is stored in the corresponding column of the new generated value row, if the value row does not exist or it is a tombstone value row a default row with default values is generated.

3. A system according to claim 1, wherein the data store engine is adapted to receive a recovery of a delete operation and search for a value row with the same primary key and highest commit timestamp, wherein
if the commit timestamp of the selected value row is equal or higher than the commit timestamp of the given delete operation, the recovery of the row is ignored,
otherwise, a tombstone value row is generated with the same primary key and the same commit timestamp as the given delete operation and the delete operation is substituted by the generated tombstone value row, if no value row exists with that primary key, the generation of the tombstone row can be omitted.

4. A system according to claim 1 wherein in a table of the database that only supports the read committed isolation level, the data store engine is adapted to maintain a single value row for each primary key resulting in a single versioning system.

5. A system according to claim 4, wherein the substitution process triggered by the data store engine is an iterative process over the operation rows with a commit timestamp lower or equal than the new highest known snapshot, said substitution process comprising the following steps that are performed for each primary key:
identify the value row with the same primary key, if it does not exist a default row with default column values is generated becoming the identified value row;
identify the operation row with the same primary key and the lowest commit timestamp, if there are two or more with the same timestamp taking first the one that was first inserted;
if the identified operation row with lowest commit timestamp is an insert, an update or an upsert operation then the identified value row with the same primary key is modified, the operations on the operation row are applied over the values of the corresponding columns in the identified value row and the result is stored in the corresponding column of the identified value row, the identified value row gets the same commit timestamp of the identified operation row and the identified operation row is removed, or a new value row with the same commit timestamp of the identified operation row is generated, the operations on the identified operation row are applied over the values of the corresponding columns in the identified value row and the result is stored in the corresponding column of the new generated value row, the previous identified value row is deleted and the identified operation row is removed;

if the identified operation row with the lowest commit timestamp is a delete operation, the identified value row with the same primary key is deleted, and the delete operation is removed.

6. A system according to claim 1 wherein at least two operation rows are combined into a single operation row when the highest notified snapshot is higher than the commit timestamps of the at least two operation rows.

7. A system according to claim 1 wherein at least two operation rows are combined into a single operation row when it is known that no snapshot will be ever read between the commit timestamp of the two operation rows.

8. A system according to claim 1 wherein the value rows are stored in a table of the database and the operation rows can be stored:
　in another table of the database, or
　in memory, or
　in a hybrid manner in the table of the database storing the value rows and the operation rows, or
　any combination of the above.

9. A system according to claim 5 wherein the data store engine is adapted to manage a garbage collection condition, wherein if a value row that is the last version for a key has a commit timestamp below the start timestamp of the oldest transaction active in the system, it can be removed.

* * * * *